(No Model.)
W. WILLIAMS.
Sorghum or Sugar Evaporator.
No. 242,726. Patented June 7, 1881.
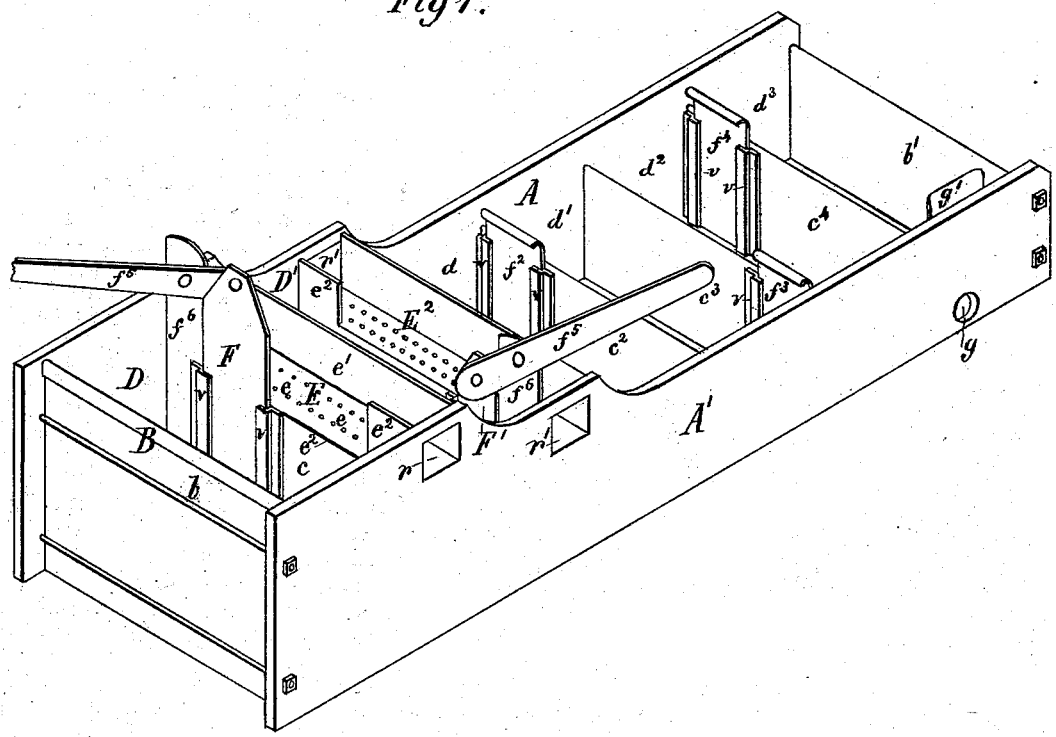
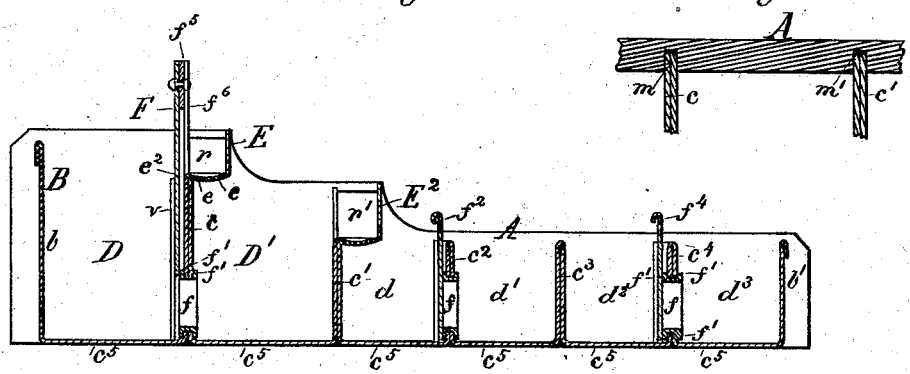
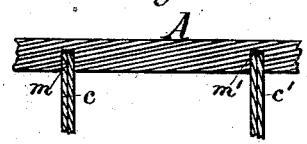
Witnesses:
Stephen N. Smith
Edw H. Thomas
Inventor:
William Williams
by his attys
Mason, Fenwick & Lawrence

UNITED STATES PATENT OFFICE.

WILLIAM WILLIAMS, OF LOUISVILLE, KENTUCKY.

SORGHUM OR SUGAR EVAPORATOR.

SPECIFICATION forming part of Letters Patent No. 242,726, dated June 7, 1881.

Application filed March 29, 1881. (No model.)

*To all whom it may concern:*

Be it known that I, WILLIAM WILLIAMS, a citizen of the United States, residing in Louisville, in the county of Jefferson and State of Kentucky, have invented a new and Improved Sorghum or Sugar Evaporator; and I do hereby declare that the following is a full, clear, and exact description thereof, reference being had to the annexed drawings, forming a part of this specification, and the letters of reference marked thereon, in which drawings—

Figure 1 is a perspective view of my improved sorghum or sugar evaporator, and Fig. 2 a longitudinal vertical section of Fig. 1. Fig. 3 is a detail view of the mode of connecting the transverse walls to the side walls of the evaporator.

The object of my invention is to provide in a cane-juice-evaporating pan two preparing-compartments of different depths, with their bottoms upon the same plane and provided with skimmers at different altitudes, and with outflow-gates, and also gated finishing-compartments in connection therewith.

In the figures, A A′ indicate the side walls of my improved evaporating-pan, which are made, as usual, of hard-wood plank.

B is a single sheet of galvanized-iron or copper, so bent and folded together between its upwardly bent-up ends $b$ $b'$ as to form double-wall transverse partitions $c$ $c'$ $c^2$ $c^3$ $c^4$, and with bottom portions, $c^5$, upon the same horizontal plane, all as clearly shown in Fig. 2. The bent-up ends or walls $b$ $b'$ and intermediate transverse double walls $c$ $c'$ $c^2$ $c^3$ $c^4$ are let into mortises cut in the wooden side walls, A and A′, the same, for example, as the walls $c$ and $c'$ are let into mortises $m$ $m'$ in the side wall, A, as indicated in detail view, Fig. 3, and when so connected together the whole may be held in place by screw-rods and nuts, as indicated in Fig. 1, thereby forming the several compartments, D D′ and $d$ $d'$ $d^2$ $d^3$.

At alternate ends of the partitions $c$, $c'$, $c^2$, $c^3$, and $c^4$ annular gateways $f$ are provided, through which the juice of the cane can, when desired, be permitted to flow first from the compartment D into D′, and so on throughout the whole series of compartments, the liquid in its course flowing from one side to the other of the evaporator until finally discharged through the aperture $g$ in compartment $d^3$. These gateways $f$ are constructed with circular flanges, as at $f'$, so that the transverse partitions or double walls $c$, $c'$, $c^2$, $c^3$, and $c^4$ may be tightly embraced by said flanges, as shown, and to form a water-tight joint, while at the same time the doubled portions of the metal sheet B, which constitute said transverse partitions, will be kept from spreading apart and held firmly in juxtaposition, as indicated in the figures. Water-tight gates, as at F F′ $f^2$ $f^3$ $f^4$, are provided, as shown, to regulate or shut off the flow of the liquid through the gateways $f$, the first two, F and F′, being provided with handles $f^5$ to articulate upon standards $f^6$, as indicated in the figures. A gate, $g'$, is made to either cut off or regulate the flow of the cane-sirup through the discharge-aperture $g$.

The sugar-cane juice to be purified and reduced to sirup is put into the largest compartment, D, its gate F, as well as the gate F′ of compartment D′, being first closed. The liquid, having been raised to the boiling-point in compartment D, will now foam up, and its foaming portion will pass over the partition $c$ and into a dishing-skimmer, E, having perforations $e$ in its bottom throughout its length, as shown. This skimmer, constructed mainly with a dishing or concave perforated bottom and a vertical imperforated back, $e'$, extends across the evaporator from side to side, as shown, and may be held between the wooden walls A A′, and with the edge $e^2$ of its perforated bottom upon the partition $c$ in any suitable manner without using solder, care being taken to make it secure in position, and with a water-tight joint between it and said walls and said partition. Near one of its ends the skimmer is made with a guard, as at $e^2$, extending up from its perforated bottom, as shown, in order to compel the foaming overflow of the boiling juice in the compartment D to pass over into the skimmer in a midway-section of its length, and so be prevented from wasting the pure sirup contained in the scum through openings $r$ in the walls A A′, with which the skimmer communicates at each of its ends. On one side of the midway-section of the skimmer E the gate F and standard $f^6$ serve the same purpose as guard $e^2$.

In operation the boiling juice in the compartment D forces its chlorophyl scum, mingled with purer liquid, up and into the skimmer, the purer cane-juice passing through the skimmer into the compartment D', while the scum passes off from the bottom of the skimmer through the waste-openings $r$ in the side walls of the evaporator. This operation continuing the compartment D' soon becomes more or less filled with partially-defecated cane-juice, which also, in boiling, forces its remaining impurities, in the condition of scum, up and into a skimmer $E^2$, through which the purer juice passes down into the compartment $d$, while the scum passes off through the openings $r'$. This second skimmer, $E^2$, it will be seen, is only elevated above the bottom $c^5$ of the evaporator about two-thirds of the height of the skimmer E, and for the following reasons: first, a much less quantity of the juice is contained in a boiling state in the compartment D' than in the compartment D; and, second, it having been partially defecated it will not foam so much as the green juice in the compartment D, and hence, to insure the discharge of its scum, the skimmer $E^2$ must be located lower down than the skimmer E.

With a sorghum or sugar evaporator thus constructed the juice of the cane will be delivered into the compartments $d$ $d'$ $d^2$ $d^3$ in a perfectly-defecated condition, which condition it is impossible to secure with an evaporator having only one skimmer. The gate-guides $v$ I apply to the several transverse partitions in any proper manner to secure a water-tight joint between them and the gates, which may be effected without the use of solder for such purpose; and I also make a water-tight joint between the concave bottoms of the skimmers E $E^2$, and the respective partitions $c$ and $c'$, with which they are connected, without the use of solder. So, also, the several compartments of the evaporator are constructed without the use of solder and in the manner shown, whereby durability is secured, which is not attainable when solder is used as an element of their construction.

Having thus described my invention, what I claim as new, and desire to secure by Letters Patent, is—

In a cane-juice-evaporating pan, the combination of the compartments D D', of different depths, the skimmers E $E^2$ at the upper edge of the partitions $c c'$, and at different altitudes with respect to the bottom of the compartments D D', and the gates F F', substantially as and for the purpose described.

Signed in presence of two subscribing witnesses.

WILLIAM WILLIAMS.

Witnesses:
JOSEPH B. READ,
JOHN M. FARRAR.